(12) United States Patent
Newport et al.

(10) Patent No.: US 8,013,835 B2
(45) Date of Patent: Sep. 6, 2011

(54) COMPUTER SYSTEM HAVING SHARED DISPLAY DEVICES

(75) Inventors: William T. Newport, Rochester, MN (US); John J. Stetcher, Rochester, MN (US); Robert Wisniewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 12/034,729

(22) Filed: Feb. 21, 2008

(65) Prior Publication Data

US 2009/0213032 A1 Aug. 27, 2009

(51) Int. Cl.
*G09G 5/00* (2006.01)
(52) U.S. Cl. ............... 345/156; 345/1.1; 345/169
(58) Field of Classification Search ............ 345/1.1–1.3, 345/156, 169
See application file for complete search history.

(56) References Cited

U.S. PATENT DOCUMENTS

| 7,373,605 B2 * | 5/2008 | Schaper | 715/730 |
| 7,532,196 B2 * | 5/2009 | Hinckley | 345/156 |
| 7,710,349 B2 * | 5/2010 | De Leon | 345/1.1 |

\* cited by examiner

*Primary Examiner* — Duc Q Dinh
(74) *Attorney, Agent, or Firm* — Cantor Colburn LLP

(57) ABSTRACT

A computer system includes a first electronic device having a first display. The first display includes a first electronic image having an anchor point. The computer system also includes a second electronic device that is moveable relative to the first electronic device. The second electronic device includes a movement sensor and a second display operatively connected with the first display. The second display includes a second electronic image that is associated with the first electronic image. Upon sensing movement of the second electronic device relative to the first electronic device, the movement sensor determines a direction of the movement relative to the anchor point and triggers a shifting of the second electronic image relative to the anchor point of the first electronic image.

20 Claims, 8 Drawing Sheets

COMPUTER SYSTEM HAVING SHARED DISPLAY DEVICES

BACKGROUND OF THE INVENTION

1. Field of the Invention

This invention relates to the art of computer systems and, more particularly, to a computer system having shared displays.

2. Description of Background

Conventionally, when a need arises to view details of an image on a computer display, a user magnifies or "zooms in" on a portion of the image in order to obtain more detail. For example, a user can zoom in to street level detail when viewing a map of a city. In addition to magnification, the user can shift an image in order to view, for example, areas of a map that are not currently on the display. Many computer applications include large images that, when presented on a display, require that some portions be excluded from view in order to present other portions for viewing. For example, when viewing maps or large spreadsheets having hundreds of columns and rows, only a small portion of the map or spreadsheet is viewable at a given time. When zooming in on portions of a map, shifting a map to view portions not on the display, or manipulating a spreadsheet to view data not on the display, an overall perspective can be lost. That is, it is often times difficult to relate the detailed image back to the big picture.

SUMMARY OF THE INVENTION

The shortcomings of the prior art are overcome and additional advantages are provided through the provision of a computer system constructed in accordance with an exemplary embodiment of the present invention. The computer system includes a first electronic device having a first display. The first display includes a first electronic image having an anchor point. The computer system also includes a second electronic device that is moveable relative to the first electronic device. The second electronic device includes a movement sensor and a second display operatively connected with the first display. The second display includes a second electronic image that is associated with the first electronic image. Upon sensing movement of the second electronic device relative to the first electronic device, the movement sensor determines a direction of the movement relative to the anchor point and triggers a shifting of the second electronic image relative to the anchor point of the first electronic image.

In accordance with another exemplary embodiment of the present invention, a method of displaying an image on a computer system including a first electronic device having a first display and a second electronic device having a movement sensor and a second display operatively connected to the first display is presented. The method includes presenting a first image on the first display with the first image including an anchor point, presenting a second image on the second display. The second image is associated with the first image. The method also includes moving the second electronic device relative to the first electronic device, detecting a direction of movement of the second electronic device relative to the anchor point, and shifting the second image in the direction of movement of the second electronic device relative to the anchor point.

Computer program products corresponding to the above-summarized methods are also described and claimed herein.

Additional features and advantages are realized through the techniques of exemplary embodiments of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution, which enables a linking of multiple display devices in which a first or master electronic device includes a first display that presents a first image and a second or slave electronic device having a second display that presents a second image that is associated with the first image. The second image shifts to correspond to movement of the first electronic device relative to the first electronic device and thus may include images associated with the first image that are not presented on the first display. In this manner, larger regions of an electronic image can be viewed while simultaneously maintaining a visual reference point.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE INVENTION

Figure 1:
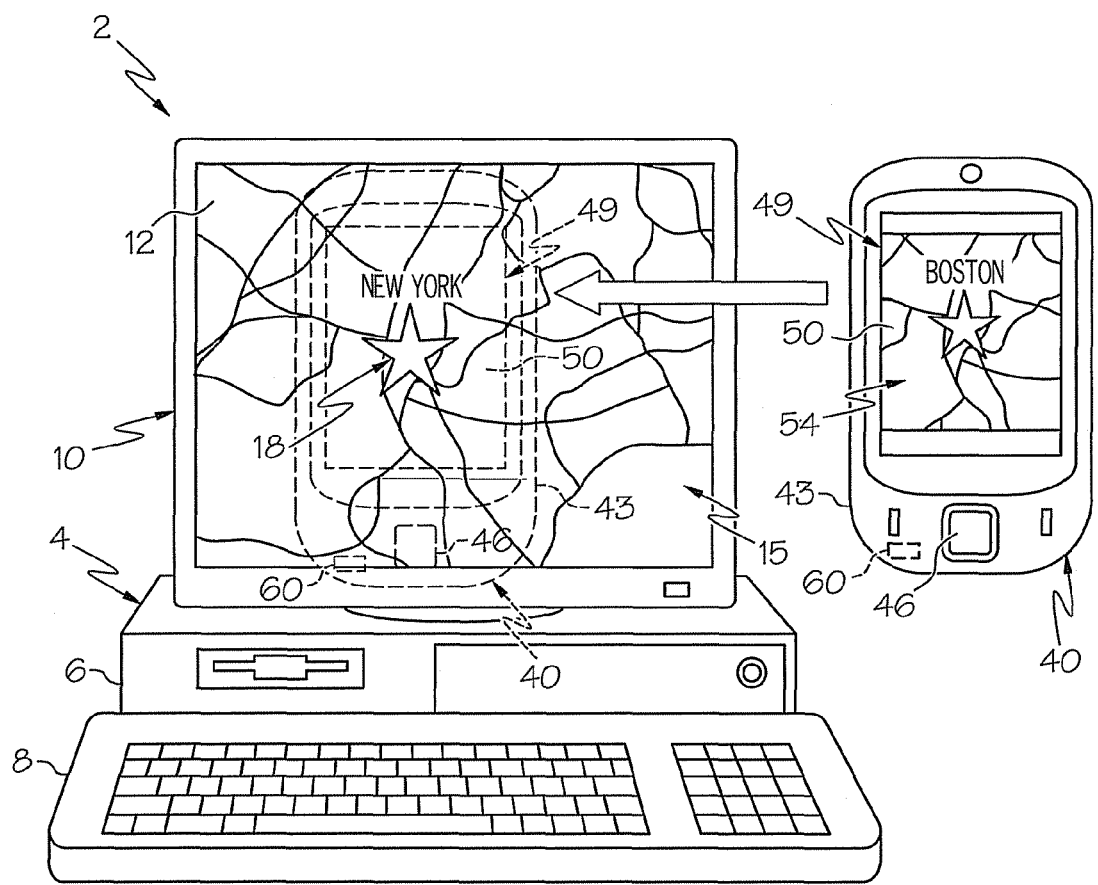
FIG. 1 illustrates a computer system including first and second electronic devices having shared displays constructed in accordance with one exemplary embodiment of the present invention.
Figure 2:
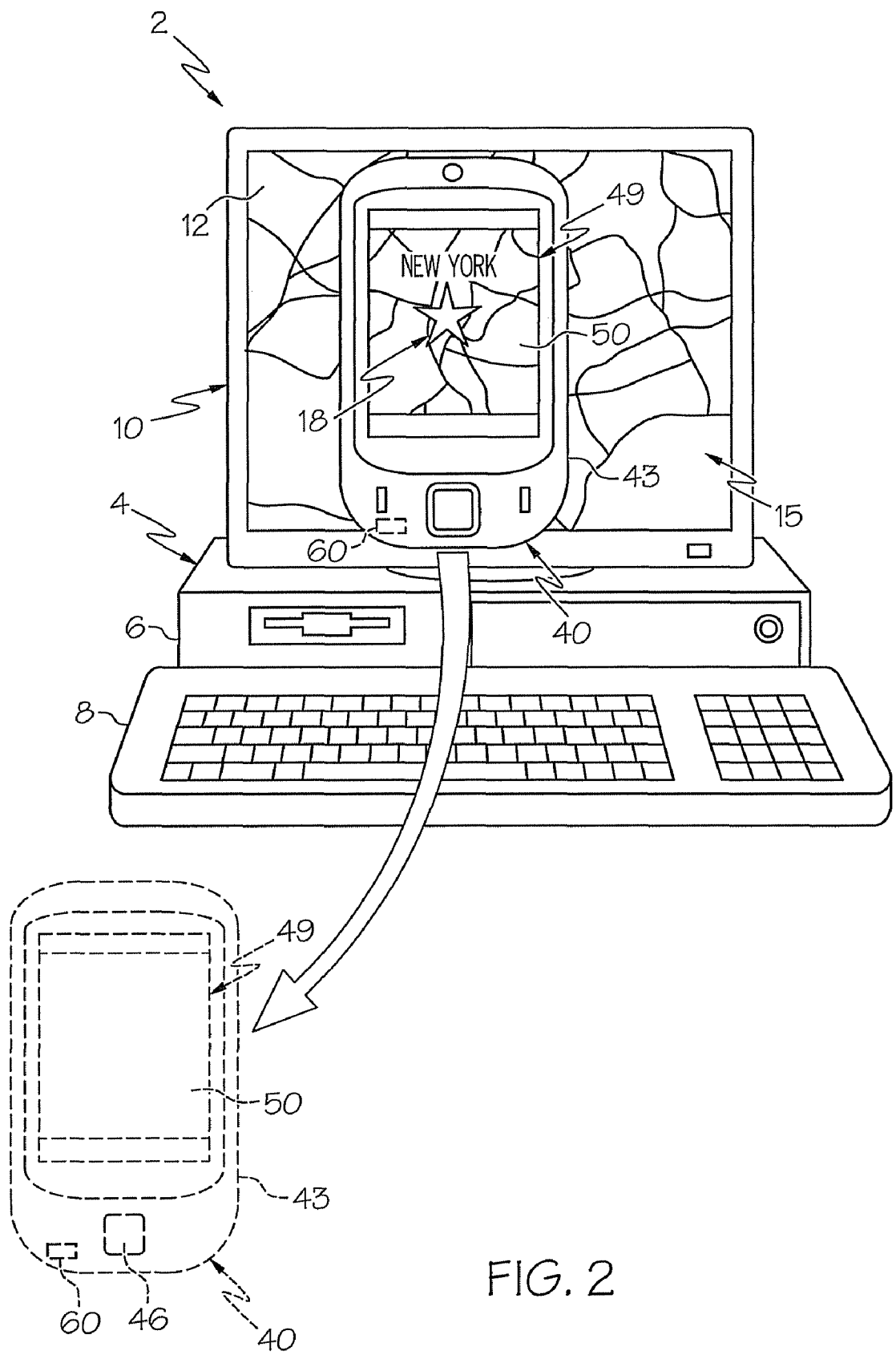
FIG. 2 illustrates the computer system of FIG. 1 showing movement in a displayed image on the second electronic device after the second electronic device has moved relative to the first electronic device.
Figure 3:
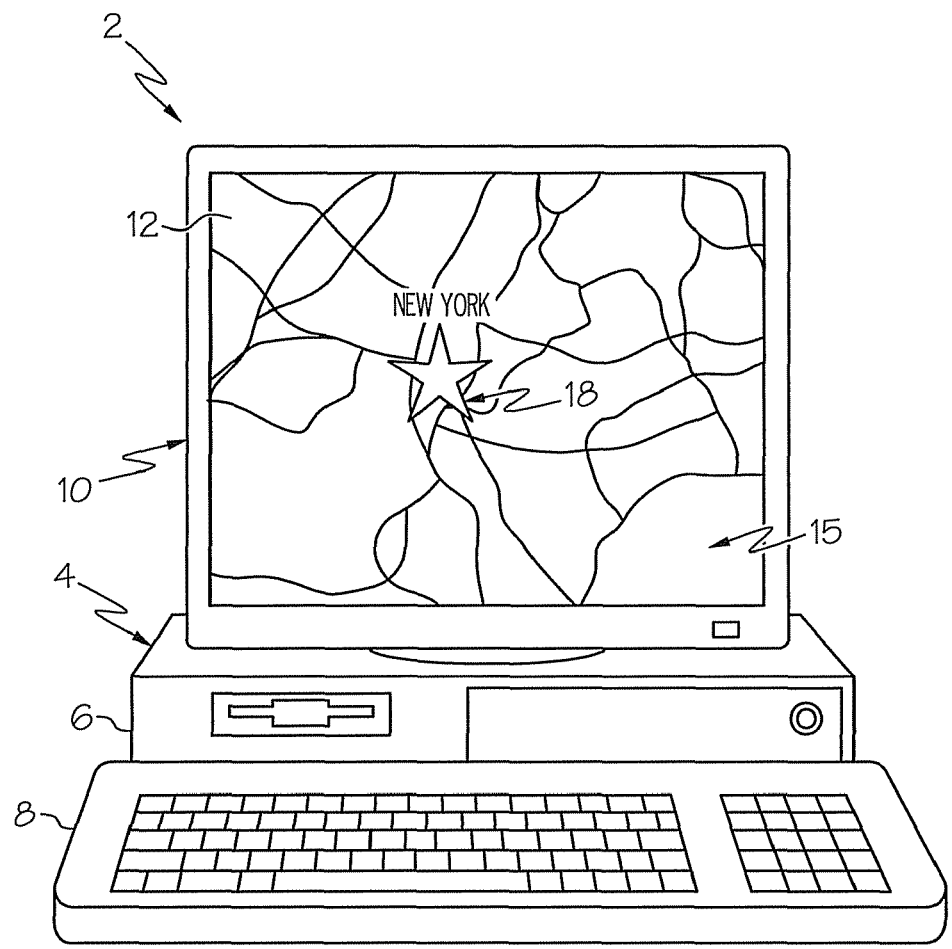
FIG. 3 illustrates the computer system of FIG. 2 showing additional movement in the displayed image on the second electronic device after the second electronic device has once again moved relative to the first electronic device.
Figure 3:
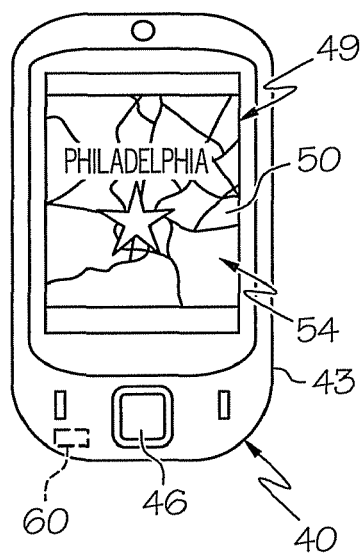

With initial reference to FIGS. 1-3, a computer system constructed in accordance with an exemplary embodiment of the present invention is generally indicated at 2. In accordance with the exemplary embodiment shown, computer system 2 includes a first electronic component 4 shown in the form of a desktop computer. Computer 4 includes a main housing 6 within which is arranged a central controller, memory; I/O ports as well various other components (not shown). Computer 4 further includes an input device 8 such as, a keyboard, and a display 10 having a display screen 12. Display screen 12 presents a first graphical electronic image 15, which in accordance with one aspect of the invention takes the form of a map. However, it should be understood that electronic image 15 can include various other graphical representations such as databases, spreadsheets and the like. In the exemplary embodiment shown, first electronic image 15 includes a fixed anchor point 18. Fixed anchor point 18 defines a fixed location on electronic image 18. As shown, anchor point 18 is represented by New York City.

Computer system 2 further includes a second electronic device 40 shown in the form of a personal digital assistant (PDA). PDA 40 includes a main housing 43 and an input member 46. PDA 40 is further shown to include a display 49 having a display screen 50. Display screen 50 presents a second electronic image 54. First and second electronic devices are linked in a master/slave relationship with first electronic device 4 being the master and second electronic device 40 being the slave in accordance with the exemplary embodiment. First and second electronic devices can be linked through a variety of communication systems, including both wired and wireless systems. In any event, second electronic device 40 includes a movement sensor 60 that determines a relative movement of second electronic device 40 relative to first electronic device 4. As will be discussed more fully below, movement of second electronic device 40 relative to first electronic device 4 results in a corresponding shift of second electronic image 54 relative to first electronic image 15 as shown in FIG. 2. More specifically, as second electronic device 40 moves, second electronic image 54 transitions in the direction of movement relative to anchor point 18 on first electronic image 15. Additional movements of second electronic device 40 relative to first electronic device 4 result in a corresponding shift in second image 54 as shown in FIG. 3.

Figure 4:
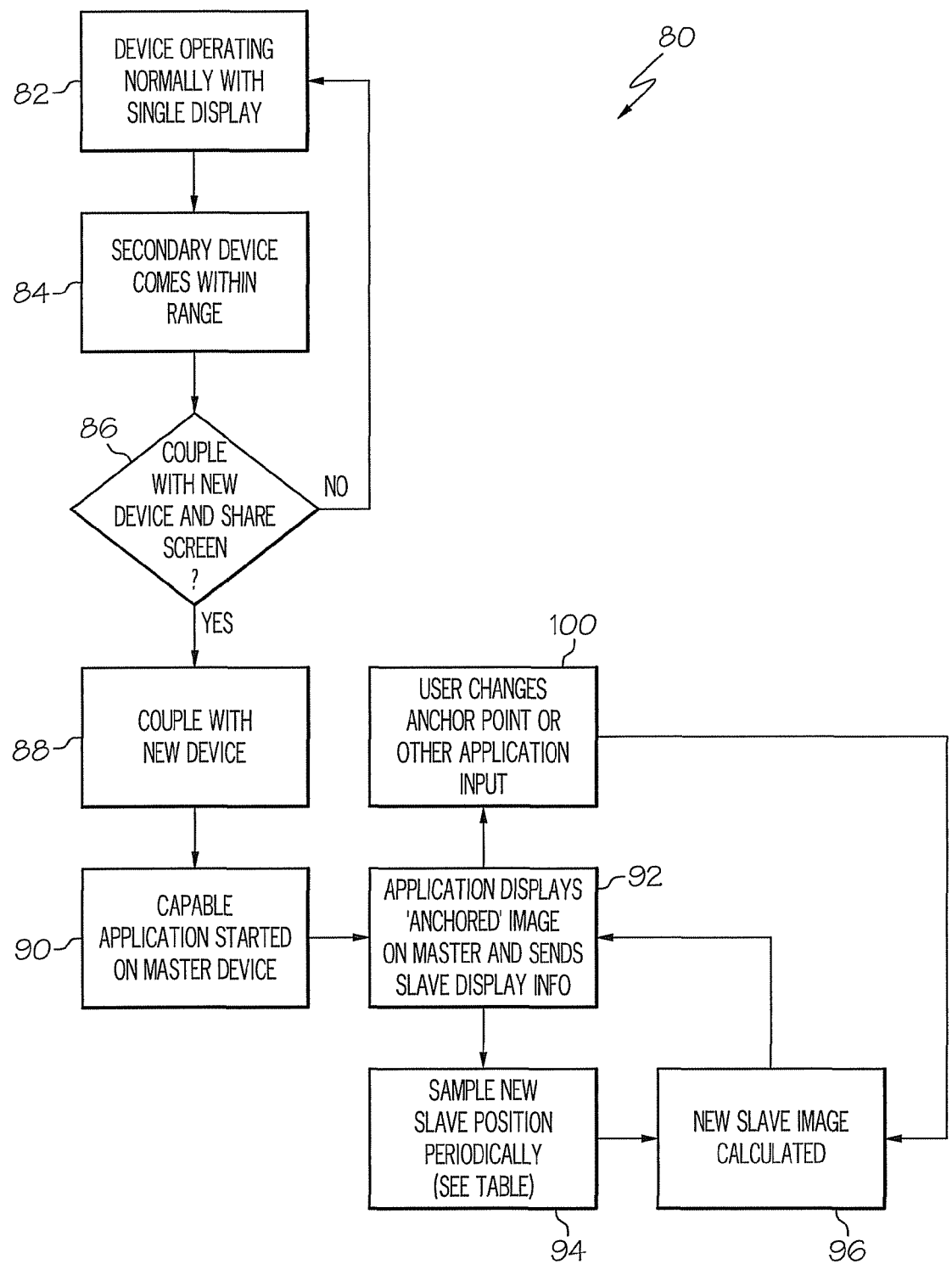
FIG. 4 is a flow diagram illustrating a method of linking screens on first and second electronic devices in accordance with one exemplary embodiment of the present invention.

In accordance with one aspect of the present invention, a method of linking displays 10 and 49 on first and second electronic devices 4 and 40 is generally indicated at 80 in FIG. 4. As indicated in box 83, first electronic device 4 initially operates normally. That is to say, first electronic device 4 is employed to carry out sets of computer instructions contained within various computer program packages until second electronic device 40 is in range and is detected by first electronic device 4 as indicated in block 84. After second electronic device 4 is in range, a user is presented with the option of coupling first and second electronic devices 4 and 40 and sharing displays 10 and 49 as indicated in block 86. At this point it should be understood that the phrase "coupling" includes both wired and wireless connections. In any event, if the user declines to couple, each electronic device functions as normal. If however, the user chooses to couple first and second electronic devices 4 and 40, the devices are linked and coupled applications are made available as indicated in block 88.

Once the user selects the desired coupled application, such as, mapping software for example, the selected application is initiated on first electronic device 4; i.e., the master device as indicated in block 90. Once the application is running on first electronic device 4, image 15 having anchor point 18 is presented on display 10, and display information is sent to second electronic device 40 as indicated in block 92 and illustrated in FIG. 1. By "display information," it should be understood that first electronic device 4 is configured to transmit electronic signals to second electronic device 40. The electronic signals may represent the second electronic image or contain information that activates software on second electronic device 40 to present the desired electronic image. At this point, first electronic device 4 scans for movement in second electronic device 40 as indicated in block 94. If movement is sensed, such as through movement sensor 60, a new image is calculated for second electronic device 40 in block 96. That is, a new image is calculated such that second electronic image 54 is shifted in the direction of movement relative to anchor point 18 as illustrated in FIGS. 2 and 3. Alternatively, if anchor point 18 is moved by the user such as indicated in block 100, a new image is calculated for second electronic device 40 in block 96 as described above. The new image can be calculated on first electronic device 4 and sent to second electronic device 40, or can simply be calculated on second electronic device 40.

Figure 5:
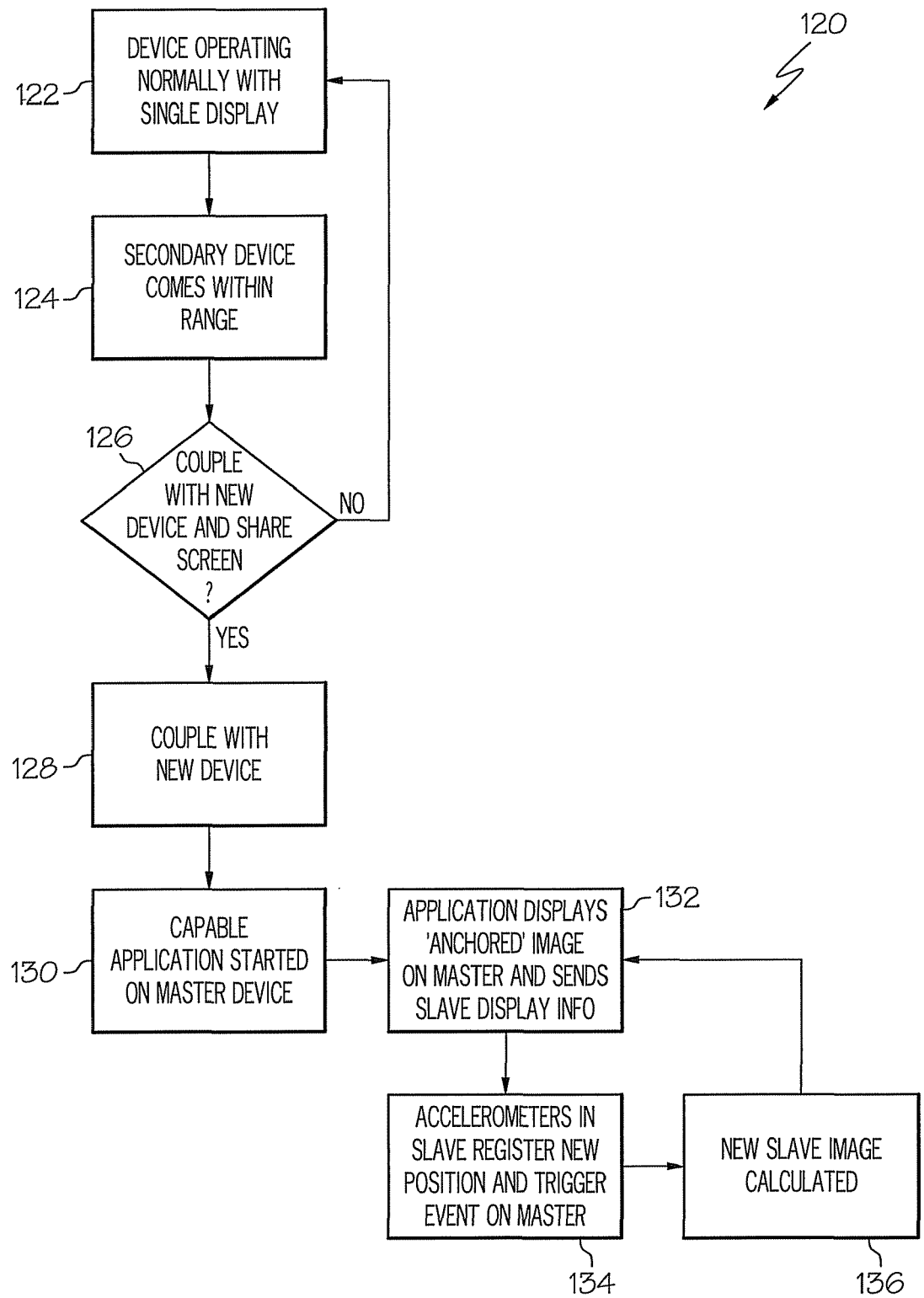
FIG. 5 is a flow diagram illustrating a method of linking screens on first and second electronic devices in accordance with another exemplary embodiment of the present invention.

Reference will now be made to FIG. 5 in describing another exemplary method 120 of linking displays 10 and 49 on first and second electronic devices 4 and 40 respectively. In a manner similar to that described above, first electronic device 4 operates normally as indicated in block 122. That is to say, first electronic device 4 is employed to carry out sets of computer instructions contained within various software packages until second electronic device 40 is in range and detected by first electronic device 4 as indicated in block 124. At this point, a user is presented with the option of coupling first and second electronic devices 4 and 40 and sharing displays 10 and 49 in block 126. In a manner also similar to that described above, if the user declines to couple, each electronic device functions as normal. If however, the user chooses to couple first and second electronic devices 4 and 40 the devices are linked and coupled applications are made available in block 128.

Once the user selects the desired coupled application such as, mapping software, the selected application is initiated on first electronic device 4, i.e., the master device as indicated in block 130. Once the application is running on first electronic device 4, image 15 having anchor point 18 is presented on display 10, and display information is sent to second electronic device 40 as indicated in block 132 and illustrated in FIG. 1. At this point, first electronic device 4 scans for movement in second electronic device 40 as indicated in block 134. In accordance with the exemplary embodiment described in FIG. 4, movement sensor 60 includes one or more accelerometers configured to detect movement along X, Y and Z axes. If movement is sensed, a new image is calculated for second electronic device 40 in block 136. That is, a new images is calculated such that second electronic image 54 is shifted in the direction of movement relative to anchor point 18 as illustrated in FIG. 2-3.

Figure 6:
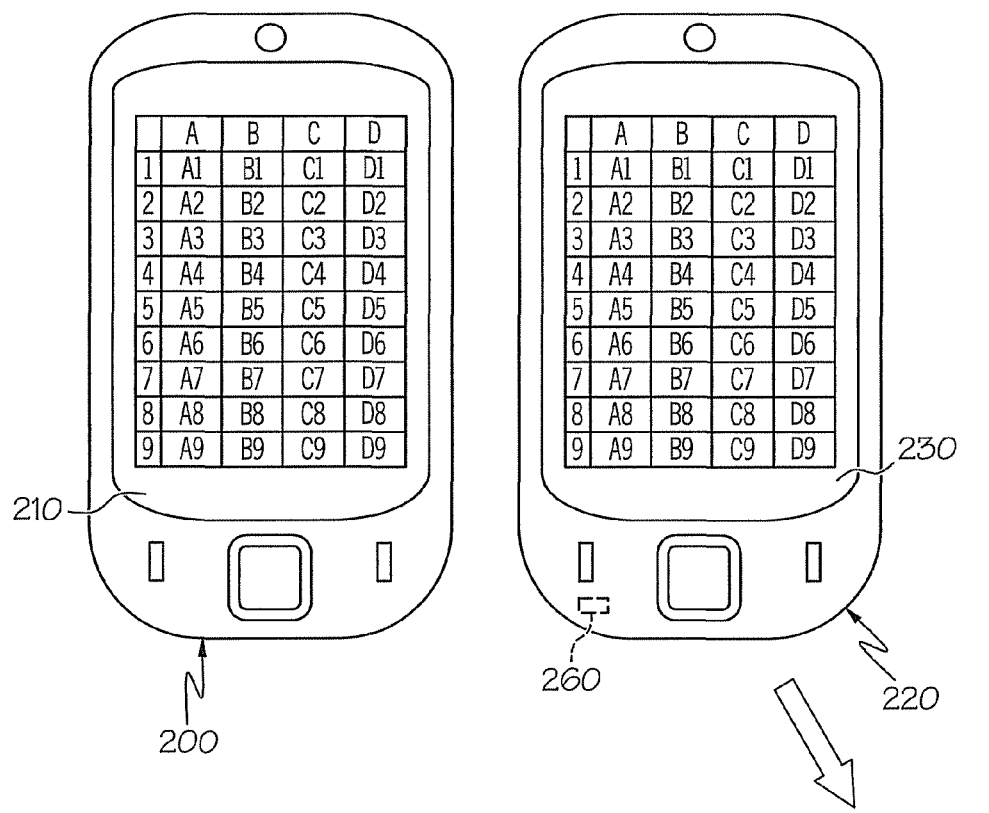
FIG. 6 illustrates a computer system including first and second electronic devices having shared displays constructed in accordance with another exemplary embodiment of the present invention.
Figure 6:
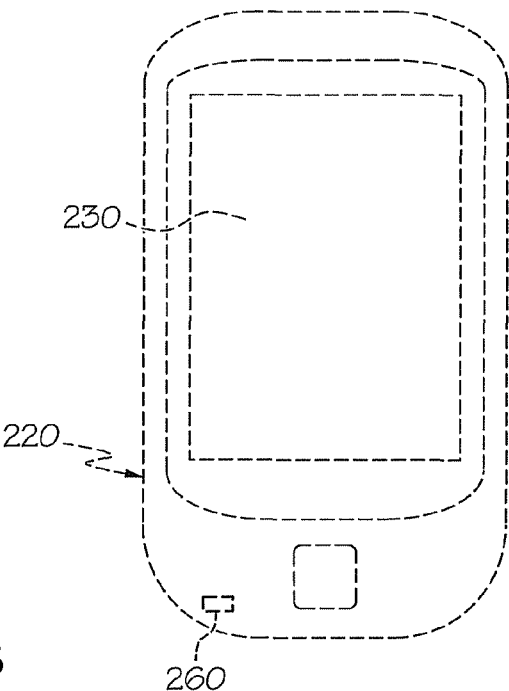
Figure 7:
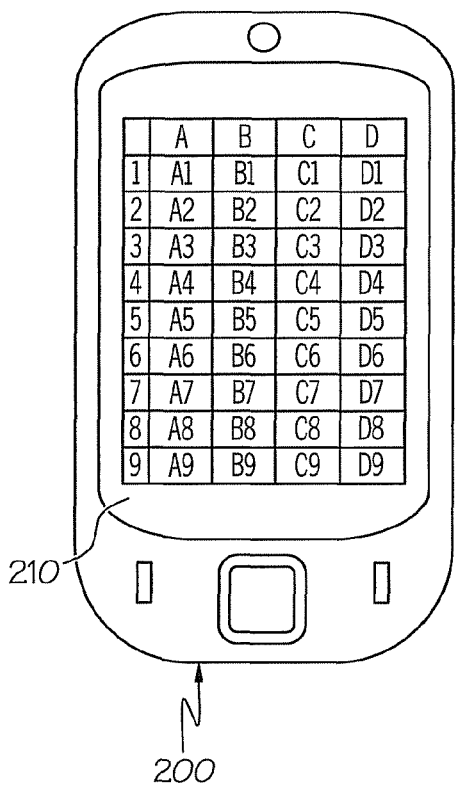
FIG. 7 illustrates the computer system of FIG. 6 showing movement in a displayed image on the second electronic device after the second electronic device has moved relative to the first electronic device.
Figure 7:
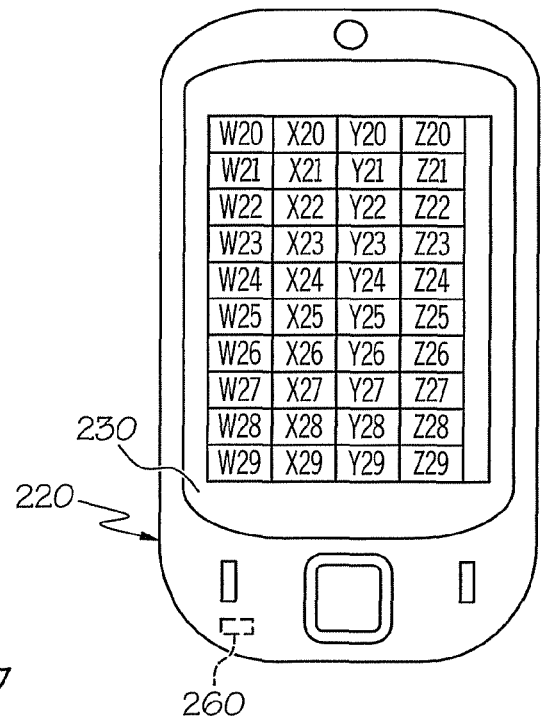

At this point it should be appreciated that exemplary embodiments of the present invention can be implemented in a wide variety of electronic devices. For example, FIG. 6 shows a first electronic device 200 in the form of a PDA having a display screen 210 and a second electronic device 220 in the form of a PDA having a display screen 230 and a movement sensor 230. First electronic device 200 displays a first electronic image which, in the embodiment shown, is an upper left hand corner of a spreadsheet application with cell A1 being the anchor point. In this configuration, movement of second electronic device 220 relative to first electronic device 200 in the direction shown results in display 230 shifting to a lower right hand corner of the spreadsheet application as illustrated in FIG. 7. It should also be appreciated that the capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Figure 8:
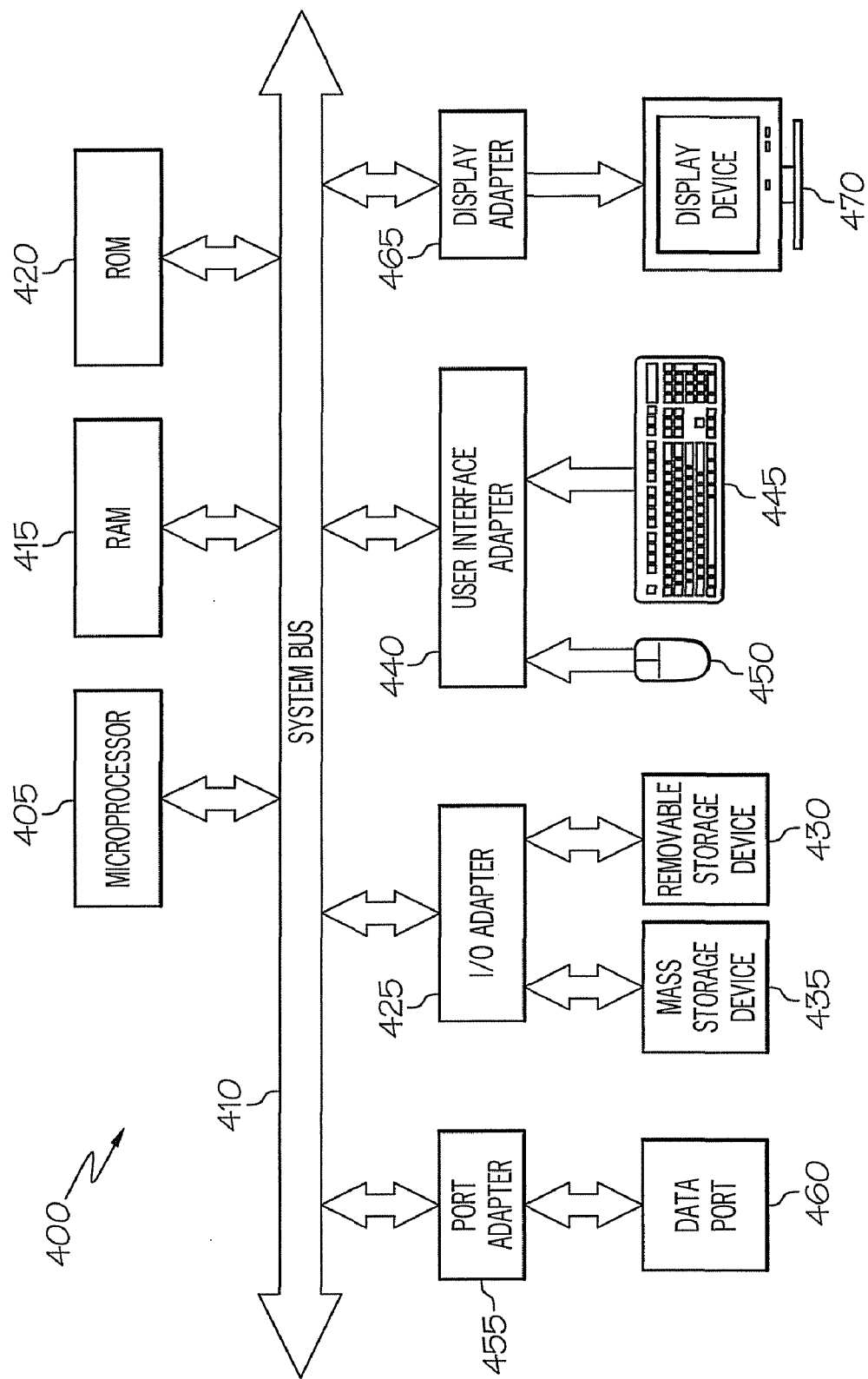
FIG. 8 is a schematic block diagram of a general-purpose computer suitable for practicing the present invention exemplary embodiments.

Generally, the method of sharing display devices between computer systems described herein is practiced with a general-purpose computer, be that desktop computer 4, hand held computer 40 and/or combinations thereof. The method may be coded as a set of instructions on removable or hard media for use by the above-described computer system. However, it should be understood that exemplary embodiments of the present invention can be run on a wide variety of computer platforms, block diagram of a one such system suitable for practicing the present invention embodiments is illustrated in FIG. 8. In FIG. 8, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

Additionally, at least one program storage device readable by a machine, tangibly embodying at least one program of instructions executable by the machine to perform the capabilities of the present invention can be provided. Moreover, the flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A computer system, comprising:
a first electronic device having a first display, the first display having a first electronic image including an anchor point; and
a second electronic device moveable relative to the first electronic device, the second electronic device including a movement sensor and a second display operatively connected with the first display, the second display having a second electronic image associated with the first electronic image, wherein upon sensing movement of the second electronic device relative to the first electronic device, the movement sensor determines a direction of the movement relative to the anchor point and triggers a shifting of the second electronic image relative to the anchor point of the first electronic image.

2. The computer system according to claim 1, wherein the movement sensor detects a magnitude and direction of movement of the second electronic device relative to the fits electronic device.

3. The computer system according to claim 1, wherein the movement sensor detects an orientation of the second display relative to the anchor point of the first electronic image.

4. The computer system according to claim 3, wherein the movement sensor includes an accelerometer.

5. The computer system according to claim 1, wherein the second electronic device is wirelessly connected to the first electronic device.

6. The computer system according to claim 1, wherein the first electronic device is once of a desktop computer and a laptop computer.

7. The computer system according to claim 1, wherein the first electronic device is a handheld computer device.

8. The computer system according to claim 1, wherein the second electronic device is a hand held computer device.

9. The computer system according to claim 8, wherein the hand held computer device is one of a personal digital assistant (PDA) and a cellular phone.

10. A method of displaying an image on a computer system including a first electronic device having a first display and a second electronic device having a movement sensor and a second display operatively connected to the first display, the method comprising:
presenting a first image on the first display, the first image including an anchor point;
presenting a second image on the second display, the second image being associated with the first image;
moving the second electronic device relative to the first electronic device;
detecting a direction of movement of the second electronic device relative to the anchor point; and
shifting the second image in the direction of movement of the second electronic device relative to the anchor point.

11. The method of claim 10, further comprising: detecting a magnitude of the movement of the second electronic device relative to the anchor point.

12. The method of claim 10, further comprising: determining an orientation of the second display relative to the anchor point.

13. The method of claim 10, wherein the first image includes a first portion and a second portion, the first portion being presented in the first display and the second portion being related to the first portion but not presented on the first display.

14. The method of claim 13, wherein the second image includes the second portion of the first image.

15. The method of claim 14, wherein the first image is a map, the first portion of the first image being a portion of the map presented on the first display and the second portion of the first image being a region of the map not presented on the first display.

16. The method of claim 14, wherein the first image is a spreadsheet, the first portion of the first image including columns and rows of the spreadsheet presented on the first display and the second portion of the first image being columns and rows of the spreadsheet not presented on the first display.

17. The method of claim 10, wherein the first electronic device transmits the second electronic image to the second electronic device.

18. A computer program product, comprising:
a computer useable non-transitory storage medium including a computer readable program, wherein the computer readable program when executed on a computer causes the computer to:
present a first image on the first display, the first image including an anchor point;
present a second image on the second display, the second image being associated with the first image;
detect a direction of movement of the second electronic device relative to the anchor point; and
shift the second image in the direction of movement of the second electronic device relative to the anchor point.

19. The computer program product according to claim 18, wherein when executed on a computer causes the computer to: detect a magnitude of the movement of the second electronic device relative to the anchor point.

20. The computer program product according to claim 18, wherein when executed on a computer causes the computer to: determine an orientation of the second display relative to the anchor point.

* * * * *

UNITED STATES PATENT AND TRADEMARK OFFICE
CERTIFICATE OF CORRECTION

PATENT NO. : 8,013,835 B2  
APPLICATION NO. : 12/034729  
DATED : September 6, 2011  
INVENTOR(S) : William T. Newport et al.

Page 1 of 1

It is certified that error appears in the above-identified patent and that said Letters Patent is hereby corrected as shown below:

Title Page

Item (75) Inventors: Delete, "Stetcher" and insert -- Stecher --.

Signed and Sealed this  
Twenty-third Day of September, 2014

Michelle K. Lee  
*Deputy Director of the United States Patent and Trademark Office*

UNITED STATES PATENT AND TRADEMARK OFFICE
CERTIFICATE OF CORRECTION

PATENT NO.         : 8,013,835 B2
APPLICATION NO.    : 12/034729
DATED              : September 6, 2011
INVENTOR(S)        : William T. Newport et al.

Page 1 of 1

It is certified that error appears in the above-identified patent and that said Letters Patent is hereby corrected as shown below:

Title Page,

Item [75], Inventors, "Stecher" (as corrected to read in the Certificate of Correction issued September 23, 2014) is deleted and patent is returned to its original state with third inventor last name in patent to read -- Stetcher --.

Signed and Sealed this
Eleventh Day of November, 2014

Michelle K. Lee
*Deputy Director of the United States Patent and Trademark Office*